US009136567B2

(12) United States Patent
Nishihara et al.

(10) Patent No.: US 9,136,567 B2
(45) Date of Patent: Sep. 15, 2015

(54) CHUCK MECHANISM OF CHARGE-DISCHARGE TEST DEVICE FOR THIN SECONDARY BATTERY

(75) Inventors: Takashi Nishihara, Kawasaki (JP);
Takahiro Kawasaki, Kawasaki (JP);
Tsutomu Okazaki, Kawasaki (JP);
Takeshi Yasooka, Yamato (JP);
Yoshikazu Niwa, Hadano (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 454 days.

(21) Appl. No.: 13/809,770

(22) PCT Filed: Jun. 20, 2011

(86) PCT No.: PCT/JP2011/003497
§ 371 (c)(1),
(2), (4) Date: Jan. 11, 2013

(87) PCT Pub. No.: WO2012/008095
PCT Pub. Date: Jan. 19, 2012

(65) Prior Publication Data
US 2013/0113494 A1 May 9, 2013

(30) Foreign Application Priority Data
Jul. 13, 2010 (JP) ................................. 2010-158910

(51) Int. Cl.
*G01N 27/416* (2006.01)
*H01M 10/48* (2006.01)
(52) U.S. Cl.
CPC ................... *H01M 10/482* (2013.01)

(58) Field of Classification Search
CPC ..... G01R 31/36; H01M 10/482; H01R 11/281
USPC ................................... 324/426; 320/107, 112
See application file for complete search history.

(56) References Cited

U.S. PATENT DOCUMENTS

| 7,417,437 | B1 * | 8/2008 | Torres | 324/426 |
| 7,948,207 | B2 * | 5/2011 | Scheucher | 320/104 |
| 2004/0251907 | A1 * | 12/2004 | Kalley | 324/426 |

FOREIGN PATENT DOCUMENTS

| JP | 11-016615 A | 1/1999 |
| JP | 2002-134176 A | 5/2002 |
| JP | 2002-170609 A | 6/2002 |
| JP | 2002-298929 A | 10/2002 |
| JP | 2004-255490 A | 9/2004 |
| JP | 2004-319334 A | 11/2004 |

* cited by examiner

*Primary Examiner* — Richard Isla Rodas
*Assistant Examiner* — Nathaniel Pelton
(74) *Attorney, Agent, or Firm* — Foley & Lardner LLP

(57) ABSTRACT

The present invention relates to a chuck mechanism of a charge-discharge test device for a thin secondary battery, and aims to provide a chuck mechanism having excellent action controllability. The chuck mechanism includes: a chuck drive part which is movable in a direction toward a battery container housing a thin secondary battery; and a chuck activation part which is located away from the chuck drive part in the direction toward the battery container and whose movement in the same direction is restricted. In the chuck mechanism, when the chuck unit is moved in the direction toward the battery container, the chuck drive part activates a chuck member of the chuck activation part whose movement in the same direction is restricted.

5 Claims, 13 Drawing Sheets

CHUCK MECHANISM OF CHARGE-DISCHARGE TEST DEVICE FOR THIN SECONDARY BATTERY

TECHNICAL FIELD

The present invention relates to a mechanism for chucking electrode terminals, used in a charge-discharge test device for a plate-shaped thin secondary battery.

BACKGROUND ART

A thin secondary battery 1 having a plate shape as in FIGS. 13 and 14 is used in many technical fields. The thin secondary battery 1 has a configuration in which a pair of sheet-shaped electrode terminals 5, 7 project out of a flat case 3 in one direction.

As in the case of a conventional secondary battery, after being produced in a factory, the thin secondary battery 1 undergoes several charge-discharge tests for quality inspection, and then only that of acceptable quality is shipped in a half-charged state as a product. Patent Document 1 discloses a charge-discharge and inspection system for thin secondary batteries of this type.

The conventional example includes: a battery container in which multiple thin secondary batteries are housed and arranged in a certain direction by inserting electrode terminals of thin secondary batteries into multiple insertion holes formed in a bottom plate of the battery container; a chuck mechanism for chucking the electrode terminals projecting from the insertion holes of the battery container; a first action (elevating) mechanism for moving the chuck mechanism; and a second action (elevating) mechanism for driving the chuck mechanism. The conventional example is configured such that after placing and arranging the multiple thin secondary batteries in the battery container, the chuck mechanism is moved closer to the battery container by the first action mechanism and is then driven to chuck the electrode terminals by the second action mechanism.

PRIOR ART DOCUMENT

Patent Document

Patent Document 1: Japanese Patent Application Publication No. 2004-319334

SUMMARY OF INVENTION

Technical Problem

However, as mentioned earlier, the conventional example includes individual mechanisms for the first action (elevating) of moving the chuck mechanism closer to the battery container, and the second action (elevating) of chucking the electrode terminals by the chuck mechanism. Accordingly, the actions need to be controlled independently, which may complicate the action controllability.

The present invention has been made in view of the above circumstances, and aims to provide a chuck mechanism of a charge-discharge test device for a thin secondary battery, the mechanism having excellent action controllability.

Solution to Problem

To achieve the above objective, a chuck mechanism of a charge-discharge test device for a thin secondary battery according to the first aspect includes a chuck unit including: a chuck drive part which is movable in a direction toward a battery container body housing a thin secondary battery; and a chuck activation part which is located away from the chuck drive part in the direction toward the battery container body and whose movement in the same direction is restricted. In the chuck mechanism, when the chuck unit is moved in the direction toward the battery container body, the chuck drive part activates a chuck member of the chuck activation part whose movement in the same direction is restricted.

In addition, according to the invention of the second aspect, in the chuck mechanism of a charge-discharge test device for a thin secondary battery according to the first aspect, the chuck drive part is a roller holding member formed to be movable in a front-rear direction of a supporting base by driving of drive means attached to the supporting base, and including on a front surface thereof multiple pairs of rollers rotatably disposed in parallel in a left-right direction of the supporting base; the chuck activation part is a chuck holding member attached in front of the roller holding member via a spring member, and including multiple chuck members each formed of a pair of strip-shaped metal plates which are inserted between the corresponding pair of rollers and whose tip end sides are spread open toward the front in a substantially V-shape in plan view; the supporting base includes a restriction part for restricting a forward movement of the chuck holding member; and the movement of the chuck holding member moved forward together with the roller holding member by the driving of the drive means is restricted by the restriction part, as well as the tip end sides of each of the chuck members inserted between the corresponding pair of rollers are closed by the corresponding pair of rollers when the roller holding member moves forward even further against a spring force of the spring member, so that each of the chuck members chucks an electrode terminal of each of thin secondary batteries housed in the battery container body in correspondence with the chuck members.

Further, according to the invention of the third aspect, in the chuck mechanism of a charge-discharge test device for a thin secondary battery according to the second aspect, the roller holding member is formed by disposing multiple divided roller holding members in parallel on two upper and lower shafts arranged in the left-right direction of the supporting base; the chuck holding member is formed by disposing multiple divided chuck holding members in parallel on two upper and lower shafts arranged in the left-right direction of the supporting base; and the spring member extends between each of coupling brackets attached to left and right outer peripheries of the roller holding member and a corresponding one of coupling brackets attached to left and right outer peripheries of the chuck holding member.

Further, according to the invention of the fourth aspect, in the chuck mechanism of a charge-discharge test device for a thin secondary battery according to the second aspect, an oxide film peeling and nipping member is attached to tip ends of the pair of metal plates. Furthermore, according to the invention of the fifth aspect, in the chuck mechanism of a charge-discharge test device for a thin secondary battery according to the fourth aspect, a slit is formed in the tip ends of the pair of metal plates in a front-rear direction, and the oxide film peeling and nipping member is attached to each of tip ends of each metal plate partitioned by the slit.

Effects of the Invention

According to the present invention, the operation of moving the chuck unit in the direction toward the battery container enables the chuck drive part to activate the chuck member of the chuck activation part to chuck a thin secondary battery. Hence, the present invention has an advantage of excellent action controllability.

DESCRIPTION OF EMBODIMENTS

Figure 1:
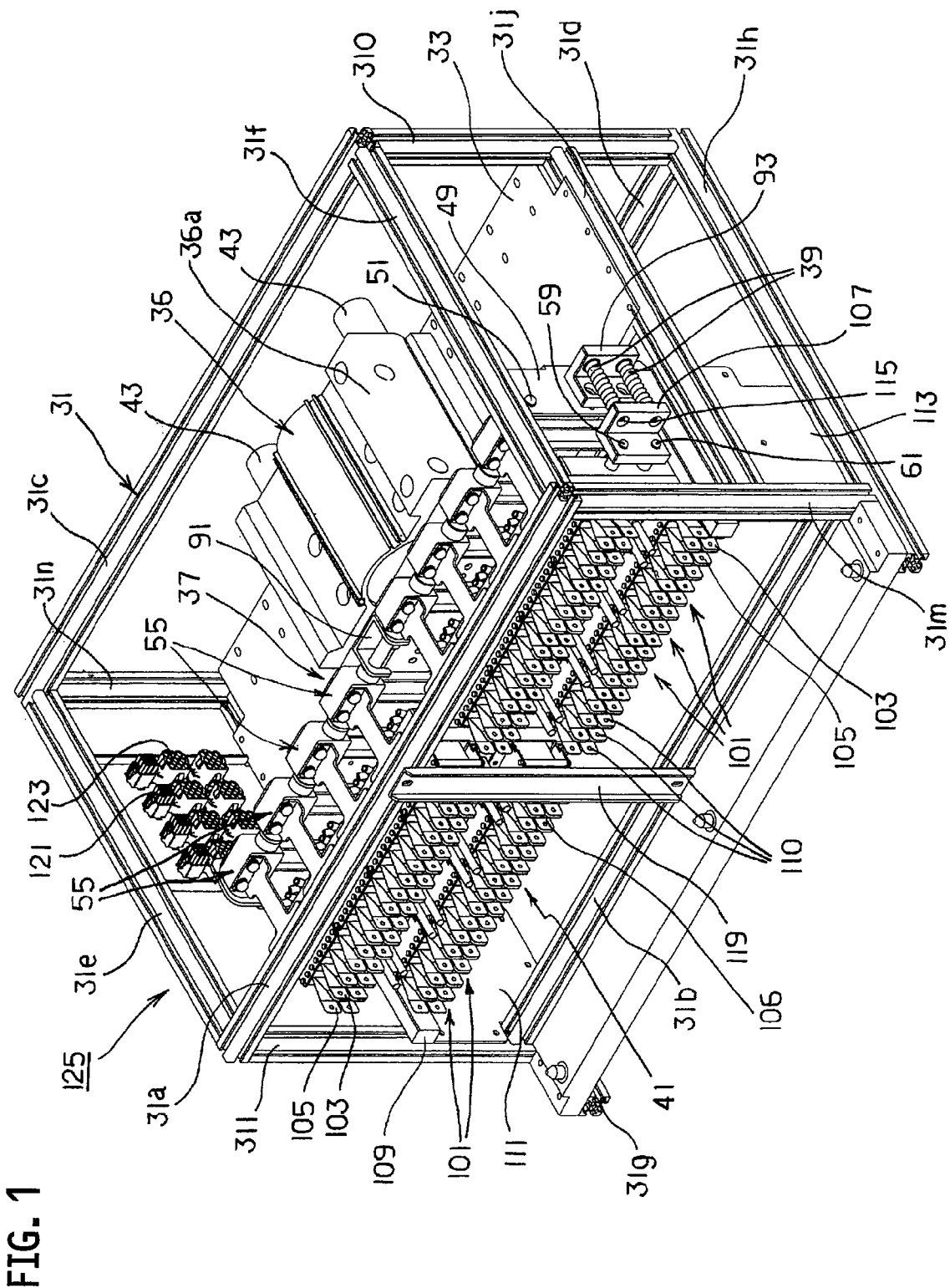
FIG. 1 is a front perspective view of a chuck mechanism of an embodiment according to claims 1 to 5.
Figure 2:
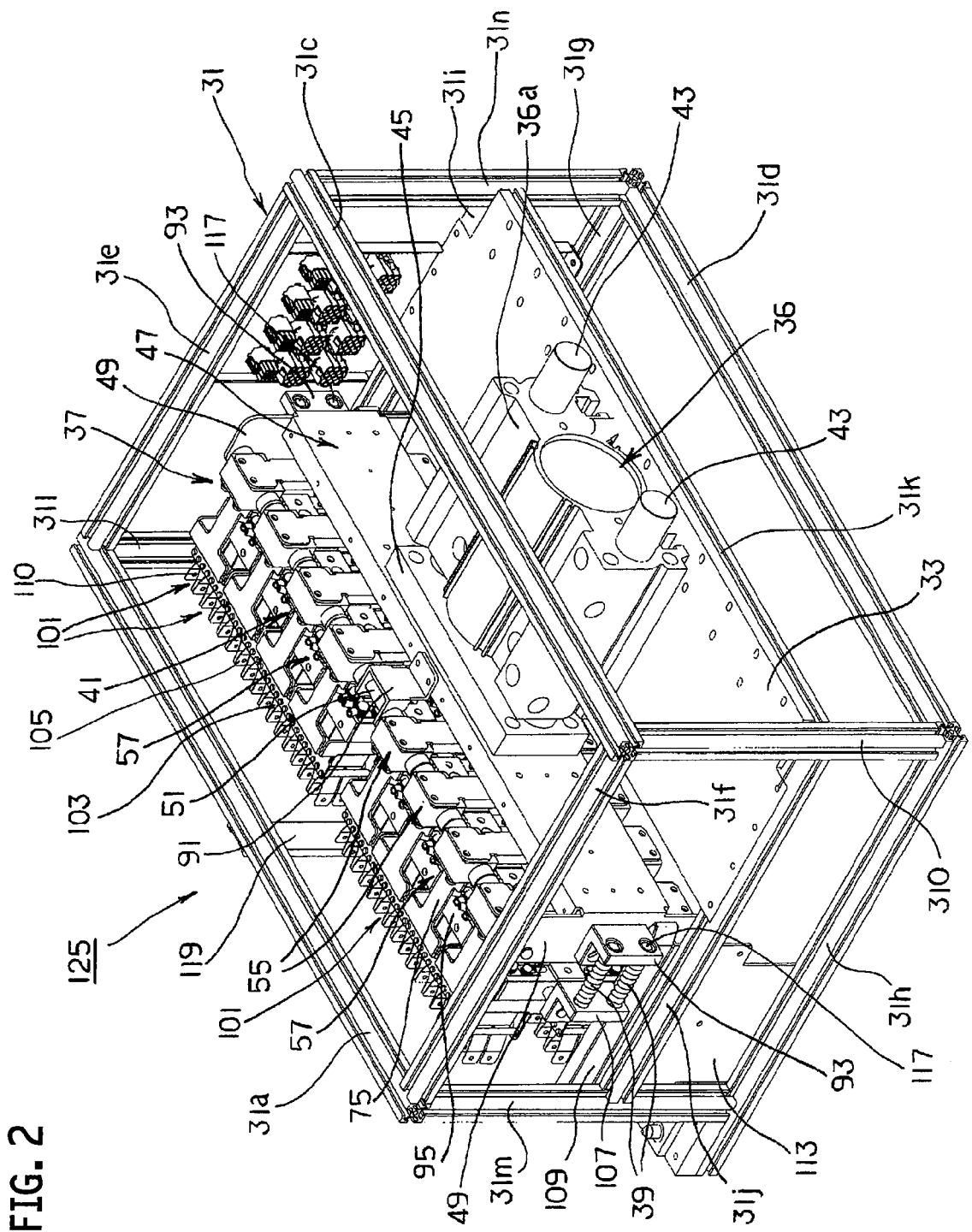
FIG. 2 is a back perspective view of the chuck mechanism.
Figure 3:
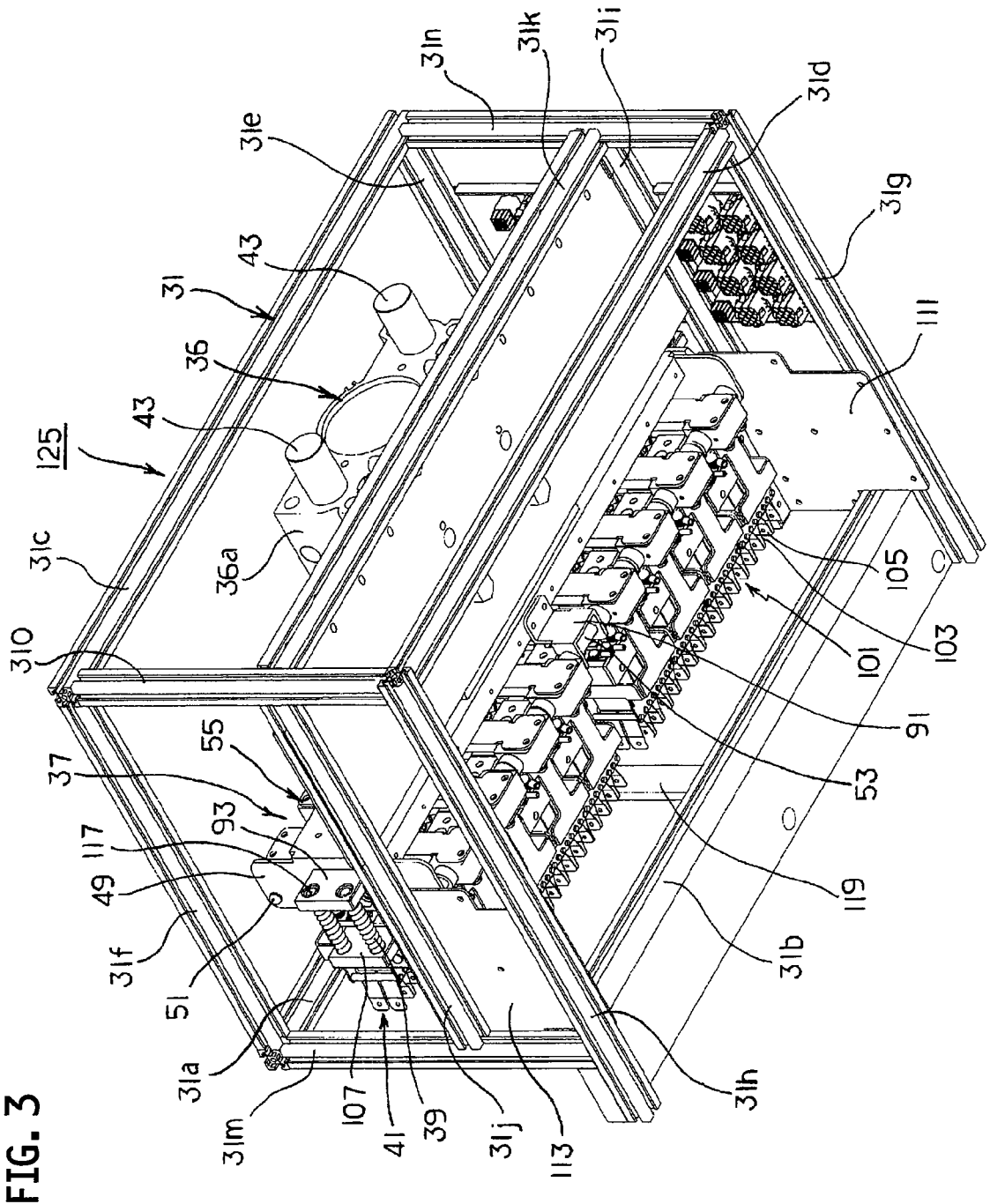
FIG. 3 is a back perspective view of the chuck mechanism.

FIGS. 1 to 12 show an embodiment of a chuck mechanism according to claims 1 to 5. In FIGS. 1 to 3, reference sign 31 denotes a supporting base having a rectangular solid shape formed of 15 columns 31a to 31o arranged in the front, back, left, and right of the supporting base 31. A supporting plate 33 covering an area between the center of the supporting base 31 in a front-rear direction and a back portion side thereof is fixed on three columns 31i to 31k laid laterally across substantial centers of the left and right sides and a substantial center of the back side of the support base 31. As in FIG. 4, a double-acting air cylinder (drive means) 36 including a piston rod 35 extending and contracting in the front-rear direction of the supporting base 31 is mounted in the center of the supporting plate 33.

Then, a roller holding member (chuck drive part) 37 including multiple pairs of rollers 89 for activating chuck members 101 of a later-mentioned chuck holding member (chuck activation part) 41 is attached to a tip end of the piston rod 35, and the chuck holding member 41 is attached in front of the roller holding member 37 with two each of left and right coil springs 39 interposed between the chuck holding member 41 and the roller holding member 37.

Specifically, as in FIGS. 1 to 4, columnar guide members 43 are inserted in a casing 36a of the air cylinder 36 on the respective left and right sides of the piston rod 35 along the piston rod 35, and a thick plate-shaped coupling member 45 is fixed on tip ends of both guide members 43 and of the piston rod 35. Moreover, a long supporting bracket 47 substantially U-shaped in plan view for supporting the roller holding member 37 is attached to the coupling member 45 in such a manner as to extend in the left-right direction of the supporting base 31. Left and right flanges 49 of the supporting bracket 47 are bent in an L-shape toward the front of the supporting base 31.

Additionally, the roller holding member 37 is formed by disposing multiple divided roller holding members 55 laterally in parallel on two upper and lower shafts 51, 53 installed across the left and right flanges 49.

Figure 5:
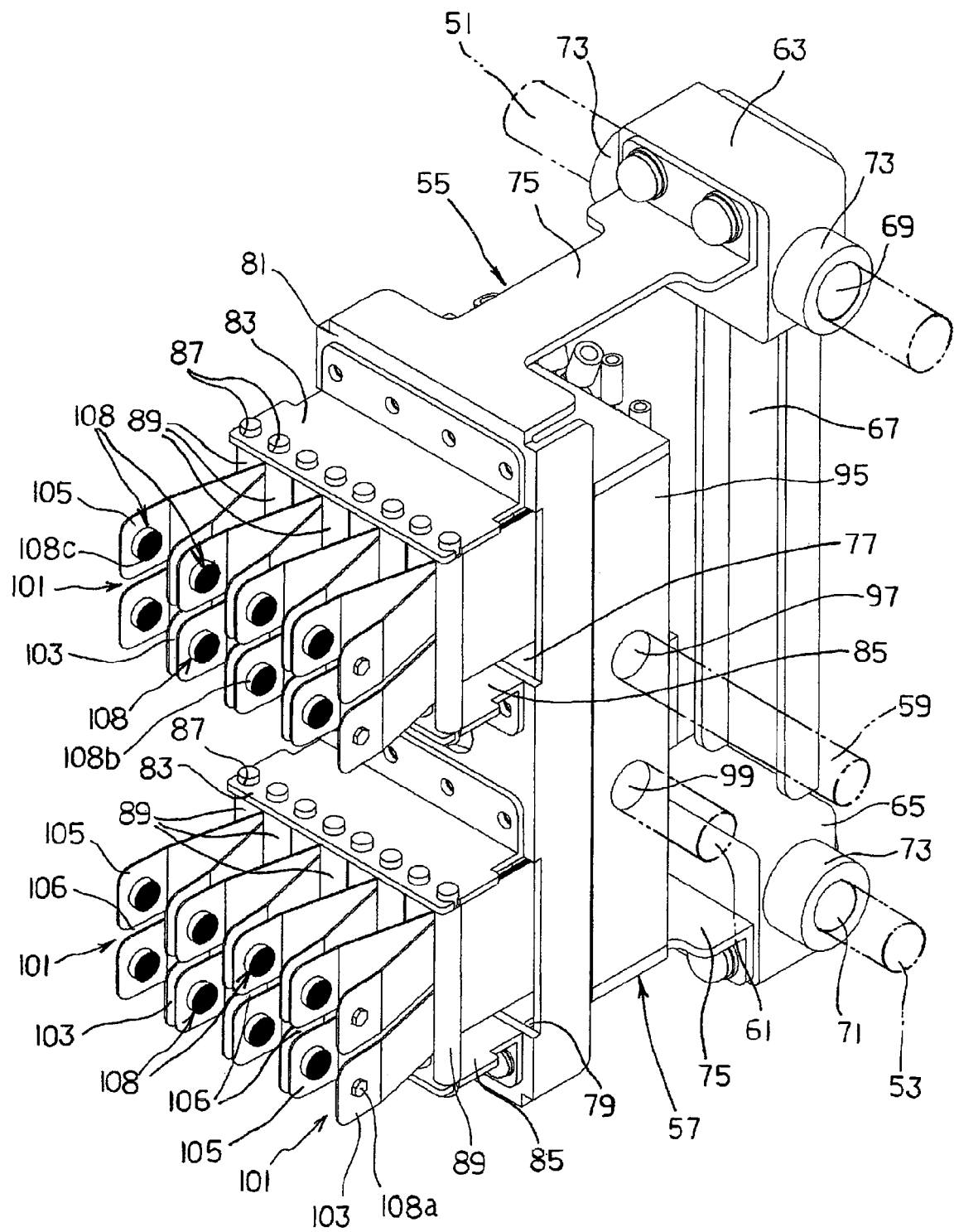
FIG. 5 is a front perspective view of a divided roller holding member and a divided chuck holding member.
Figure 6:
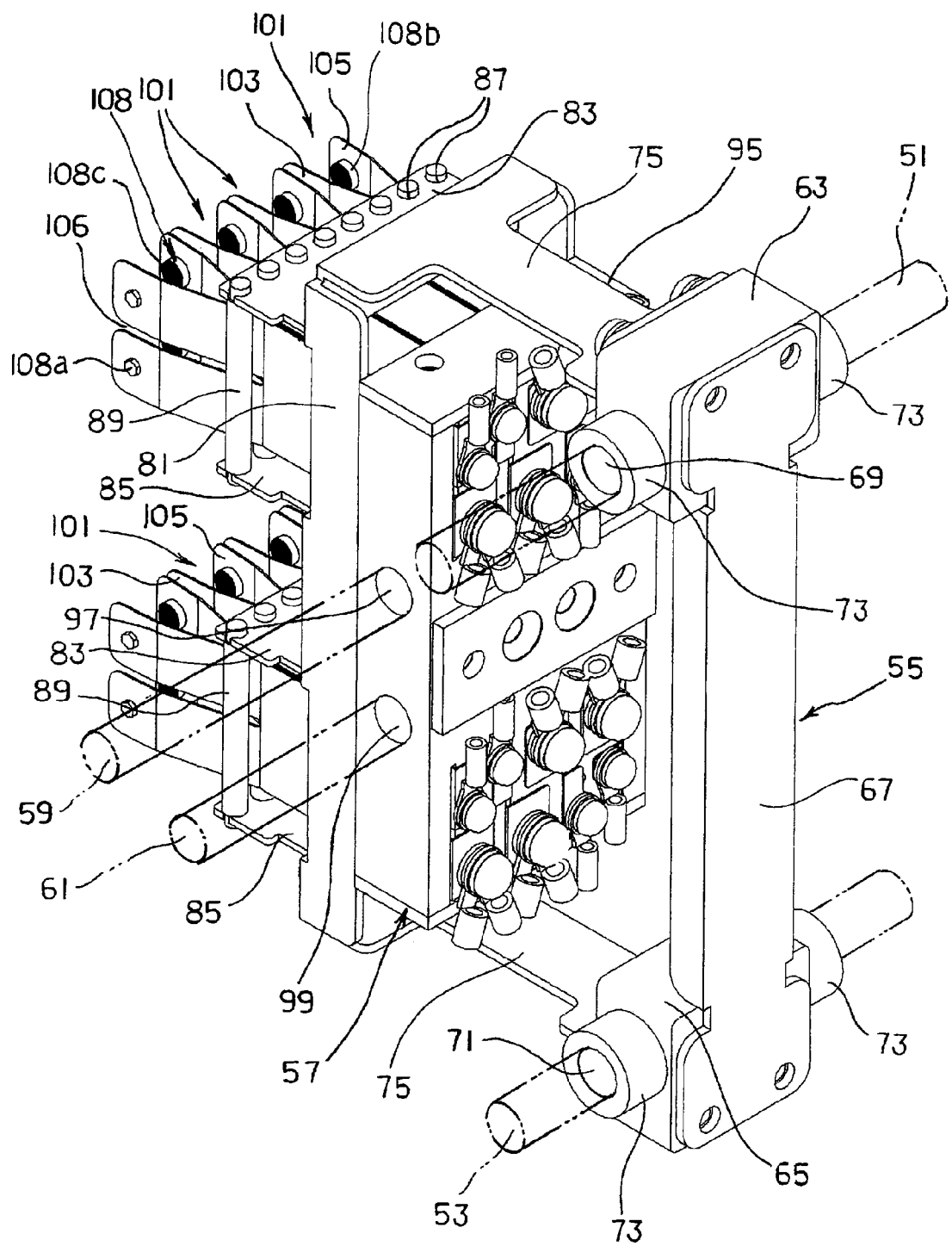
FIG. 6 is a back perspective view of the divided roller holding member and the divided chuck holding member.

FIGS. 5 and 6 each show one of the divided roller holding members 55 and a divided chuck holding member 57. As mentioned earlier, the roller holding member 37 is formed by disposing the multiple divided roller holding members 55 in parallel on the shafts 51, 53, and as will be mentioned later, the chuck holding member 41 is formed by disposing multiple divided chuck holding members 57 in parallel on two upper and lower shafts 59, 61.

As in FIGS. 5 and 6, first of all in the divided roller holding member 55, two upper and lower block members 63, 65 having a rectangular solid shape are coupled by a single coupling plate 67. A shaft insertion hole 69 into which the shaft 51 is inserted is formed in the center of the upper block member 63, and a shaft insertion hole 71 into which the shaft 53 is inserted is provided in the center of the lower block member 65. Tubular spacers 73 through which the shaft insertion holes 69, 71 are open project on left and right sides of each of the block members 63, 65.

A pair of upper and lower arm members 75 substantially L-shaped in cross section are respectively screwed on the front sides of the block members 63, 65. A roller attachment plate 81 in which upper and lower rectangular openings 77, 79 are formed is integrally formed on tip ends of the arm members 75, and the roller attachment plate 81 is disposed to face the coupling plate 67.

Moreover, a pair of roller attachment brackets 83, 85 are fixed in upper and lower parts of each of the openings 77, 79 of the roller attachment plate 81, and an even number of roller attachment holes 87 are provided at equal intervals on tip end sides of each of the roller attachment brackets 83, 85 in such a manner that the sets of roller attachment holes 87 face each other. In addition, the multiple pairs of rollers 89 (four pairs on each of the upper and lower pairs of brackets in the embodiment) are rotatably attached to the roller attachment holes 87 between the upper and lower pairs of roller attachment brackets 83, 85.

The divided roller holding member 55 is thus configured, and as mentioned earlier, the two upper and lower shafts 51, 53 installed across the left and right flanges 49 of the supporting bracket 47 are inserted into the upper and lower shaft insertion holes 69, 71 of each of the divided roller holding members 55 (block member 63, 65). As in FIGS. 2 and 3, the two shafts 51, 53 are inserted into holding members 91 extending frontward from the centers of upper and lower parts of the supporting bracket 47, respectively. On left and right sides of the holding members 91, four each of the divided roller holding members 55 are disposed in parallel between the shafts 51, 53 with the spacers 73 interposed therebetween. The roller holding member 37 is supported by the supporting bracket 47. Additionally, a coupling bracket 93 L-shaped in cross section is attached to an outer periphery of each of the left and right flanges 49.

Next, a description is given of a configuration of the chuck holding member 41. As in FIG. 1, the chuck holding member 41 also has a configuration in which the multiple divided chuck holding members 57 are disposed laterally in parallel on the two upper and lower shafts 59, 61 arranged in the left-right direction of the supporting base 31.

As in FIGS. 5 and 6, the divided chuck holding member 57 is paired with the divided roller holding member 55 to form a unit, and thus the roller holding member 37 and the chuck holding member 41 form a chuck unit as a whole.

In the drawings, reference sign 95 denotes a thick plate-shaped chuck attachment member disposed along the roller attachment plate 81 between the arm members 75, and the shafts 59, 61 are inserted into shaft insertion holes 97, 99, which are provided in upper and lower parts of the center of the chuck attachment member, in such a manner as to extend in the left-right direction of the supporting base 31. Then, the multiple (four each in upper and lower parts of the chuck attachment member 95 in the embodiment) chuck members 101 are disposed laterally in parallel in upper and lower rows in correspondence with the aforementioned pairs of rollers 89, in upper and lower parts of a front surface of the chuck attachment member 95.

As shown in the drawings, the chuck member 101 is formed of a pair of strip-shaped metal plates 103, 105 made of phosphor bronze, for example, having a spring-like nature. The back end sides of the metal plates 103, 105 are lapped and joined together and penetrate a through hole (not shown) formed in the chuck attachment member 95. The back end of one metal plate 103 projecting from a back surface of the chuck attachment member 95 is bent in an L-shape along the back surface of the chuck attachment member 95, and screwed onto the back surface. Similarly, the back end of the other metal plate 105 projecting from the back surface of the chuck attachment member 95 is bent in an L-shape along the back surface of the chuck attachment member 95, and screwed onto the back surface. As in FIG. 6, the back ends of the metal plates 103, 105 are cut into short lengths in upper and lower directions and disposed in upper and lower parts of the back surface of the chuck attachment member 95. Moreover, wires of a charge-discharge test device can be connected to the back ends of the metal plates 103, 105 projecting from the back surface of the chuck attachment member 95.

Additionally, the aforementioned pair of rollers 89 are disposed in correspondence with each chuck member 101 (the metal plates 103, 105) projecting toward the front of the chuck attachment member 95, and each pair of metal plates 103, 105 are inserted between the corresponding pair of rollers 89.

As in FIG. 5, the tip end sides of the metal plates 103, 105 inserted between the pair of rollers 89 spread open in a substantially V-shape in plan view, and the tip ends thereof are bent slightly inward. As will be mentioned later, when the roller holding member 37 is moved forward by driving of the air cylinder 36, the metal plates 103, 105 (the chuck member 101) being spread open in the substantially V-shape in plan view are closed by the pair of rollers 89.

In addition, a slit 106 is formed in the front-rear direction at the tip end of each of the metal plates 103, 105. As in FIG. 5, a pair of oxide film peeling and nipping members (hereinafter referred to as "peeling and nipping members") 108 are fixed by riveting, on the tip end sides of the metal plates 103, 105 partitioned by the slit 106.

Specifically, as in FIG. 1, an attachment hole 110 to which the peeling and nipping member 108 is fixed by riveting is provided on the tip end side of each of the metal plates 103, 105 partitioned by the slit 106. As in FIG. 5, the peeling and nipping member 108 is formed of a leg member 108a fixed by riveting to the attachment hole 110, and a thick disk-shaped head portion 108b having a circular shape in plan view integrally formed with the leg member 108a. Moreover, irregularities 108c are formed by knurling on a nipping surface which is a top part of the head portion 108b. As will be mentioned later, when the metal plates 103, 105 are closed by the pair of rollers 89 with the electrode terminals 5, 7 of the thin secondary battery 1 being disposed between the metal plates 103, 105, the irregularities 108c of the pair of peeling and nipping members 108 are pressed against the front and back sides of the electrode terminals 5, 7 to peel off the oxide film formed on the surfaces of the electrode terminals 5, 7.

The chuck member 101 is configured in the above-mentioned manner, and as has been described, the four chuck members 101 are disposed laterally in parallel at upper and lower parts of the front surface of the chuck attachment member 95. Additionally, the chuck holding member 41 is formed by disposing the divided chuck holding members 57 in parallel between the two shafts 59, 61 in correspondence with the divided roller holding members 55.

As in FIGS. 1 to 3, a coupling bracket 107 L-shaped in cross section is attached to projecting ends of the shafts 59, 61 projecting outward from each of the left and right divided chuck holding members 57.

The coupling brackets 107 and the coupling brackets 93 are held to be movable in the front-rear direction of the supporting base 31 by guide members 109 attached on left and right sides of the supporting base 31. One guide member 109 is supported by a plate 111 which is attached among the columns 31g, 31l, 31i on the right side of the supporting base 31, and the other guide member 109 is supported by a plate 113 which is attached among the columns 31h, 31j, 31m on the left side of the supporting base 31.

Moreover, as in FIG. 1, two shafts 117 inserted through upper and lower shaft insertion holes 115 provided in each coupling bracket 107 are attached to the corresponding coupling bracket 93 in parallel. Additionally, the coil spring (spring member) 39 is wound around each of the shafts 117. As in FIGS. 1 to 7, when the piston rod 35 of the air cylinder 36 is retracted, the chuck member 101 is inserted between the rollers 89, the tip end sides of the chuck member 101 are spread open in the V-shape, and the chuck holding member 41 is located away from the roller holding member 37 at the front thereof by a spring force of the coil spring 39.

Figure 4:
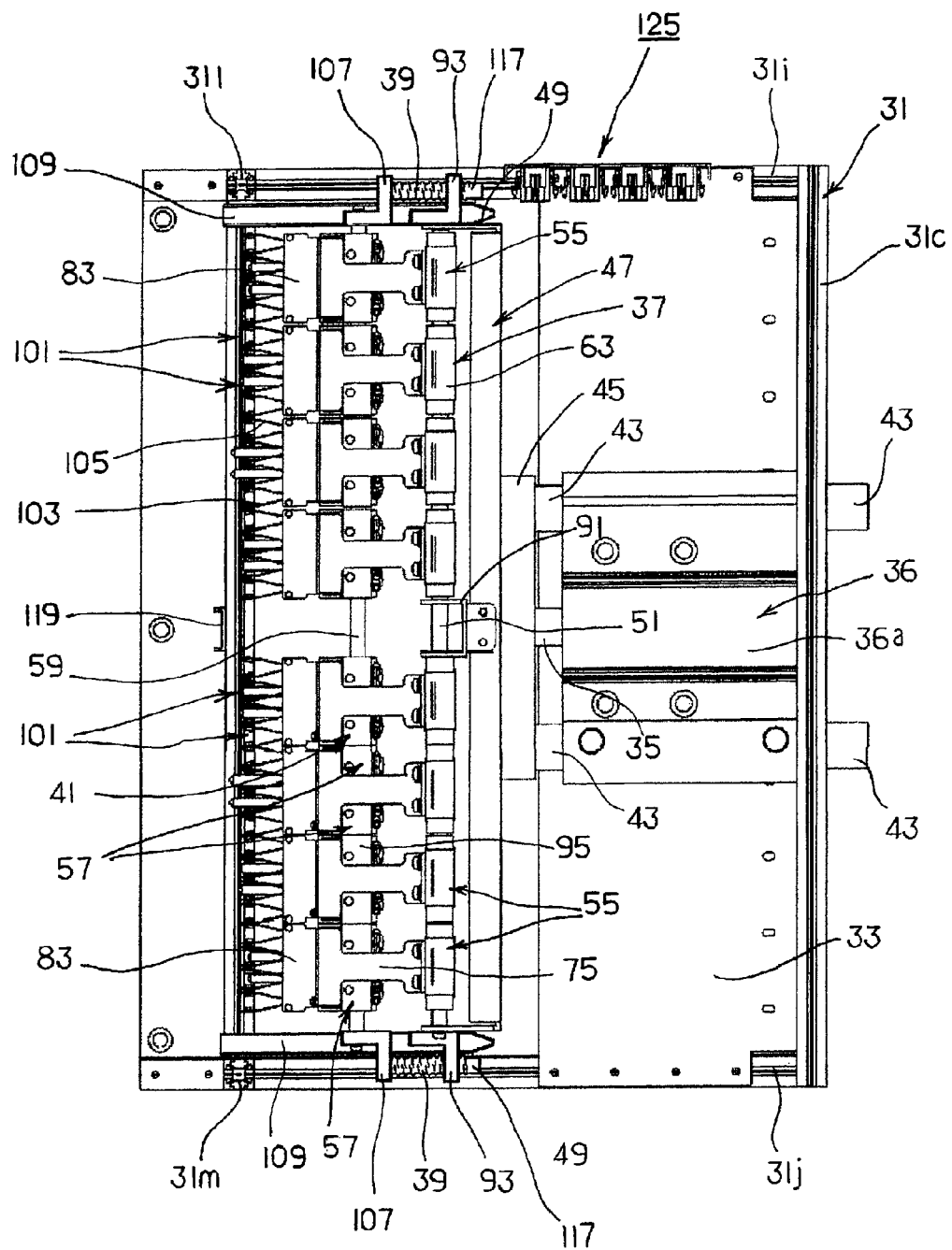
FIG. 4 is a plan view of the chuck mechanism.
Figure 7:
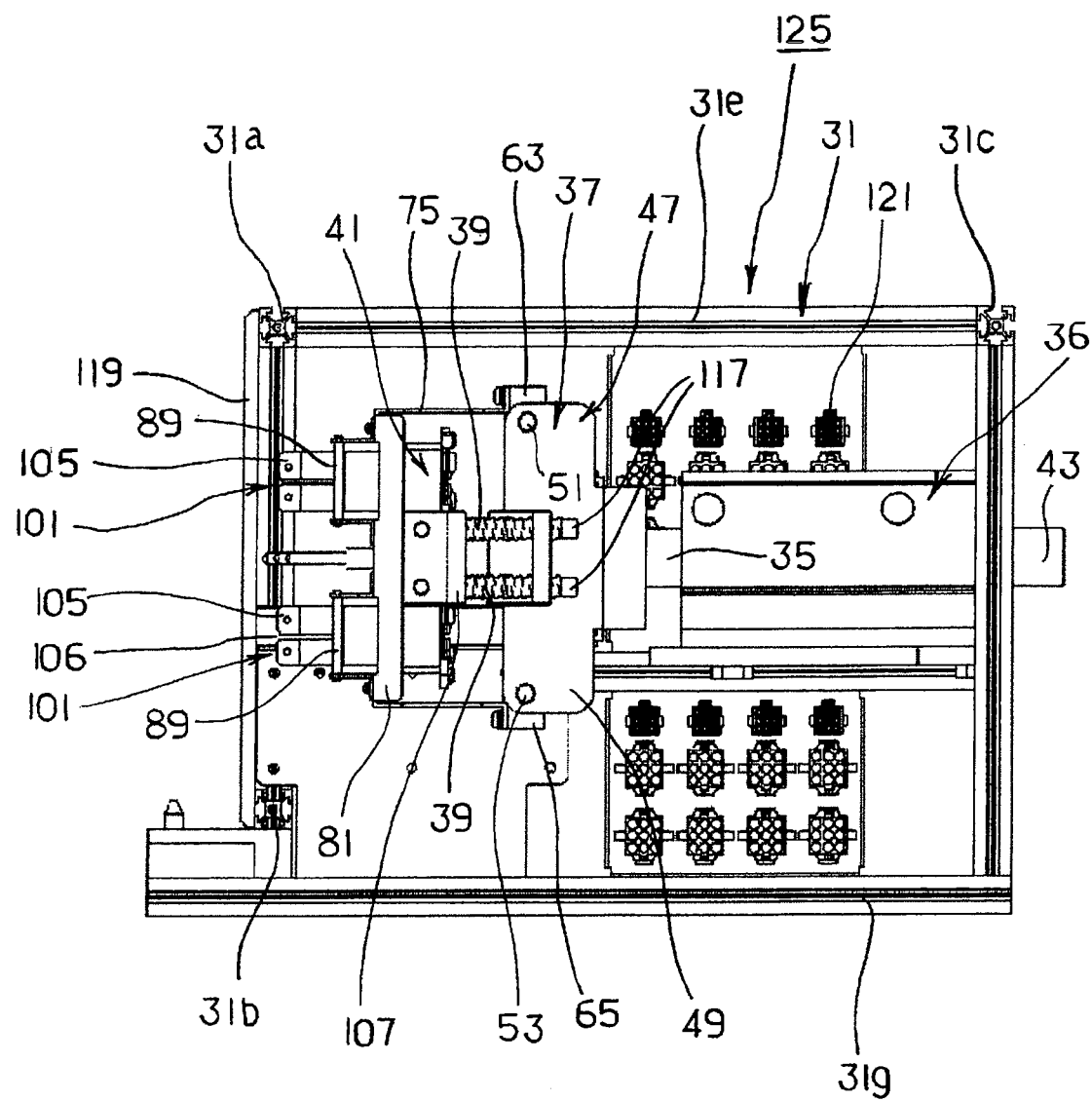
FIG. 7 is a lateral view of the chuck mechanism.

Note that in this state, the chuck member 101 is disposed inside the supporting base 31 as in FIGS. 4 and 7.

Then, when the air cylinder 36 is driven and the piston rod 35 extends forward from the state in FIGS. 1 to 7, the roller holding member 37 attached to the piston rod 35 and the chuck holding member 41 attached to the roller holding member 37 are moved forward. As in FIGS. 8 and 9, when the coupling brackets 107 attached to the left and right outer peripheries of the chuck holding member 41 reach the left and right columns 31l, 31m of the supporting base 31, the coupling brackets 107 come into contact with the columns (restriction parts) 31l, 31m to restrict forward movement of the chuck holding member 41.

Additionally, as in FIG. 1, a column 119 (restriction part) is installed to vertically bridge the columns 31a, 31b of the supporting base 31 at the centers thereof. When the left and right coupling brackets 107 come into contact with the columns 31l, 31m as mentioned above, the shafts 59, 61 also come into contact with the column 119 to restrict forward movement of the chuck holding member 41.

Figure 8:
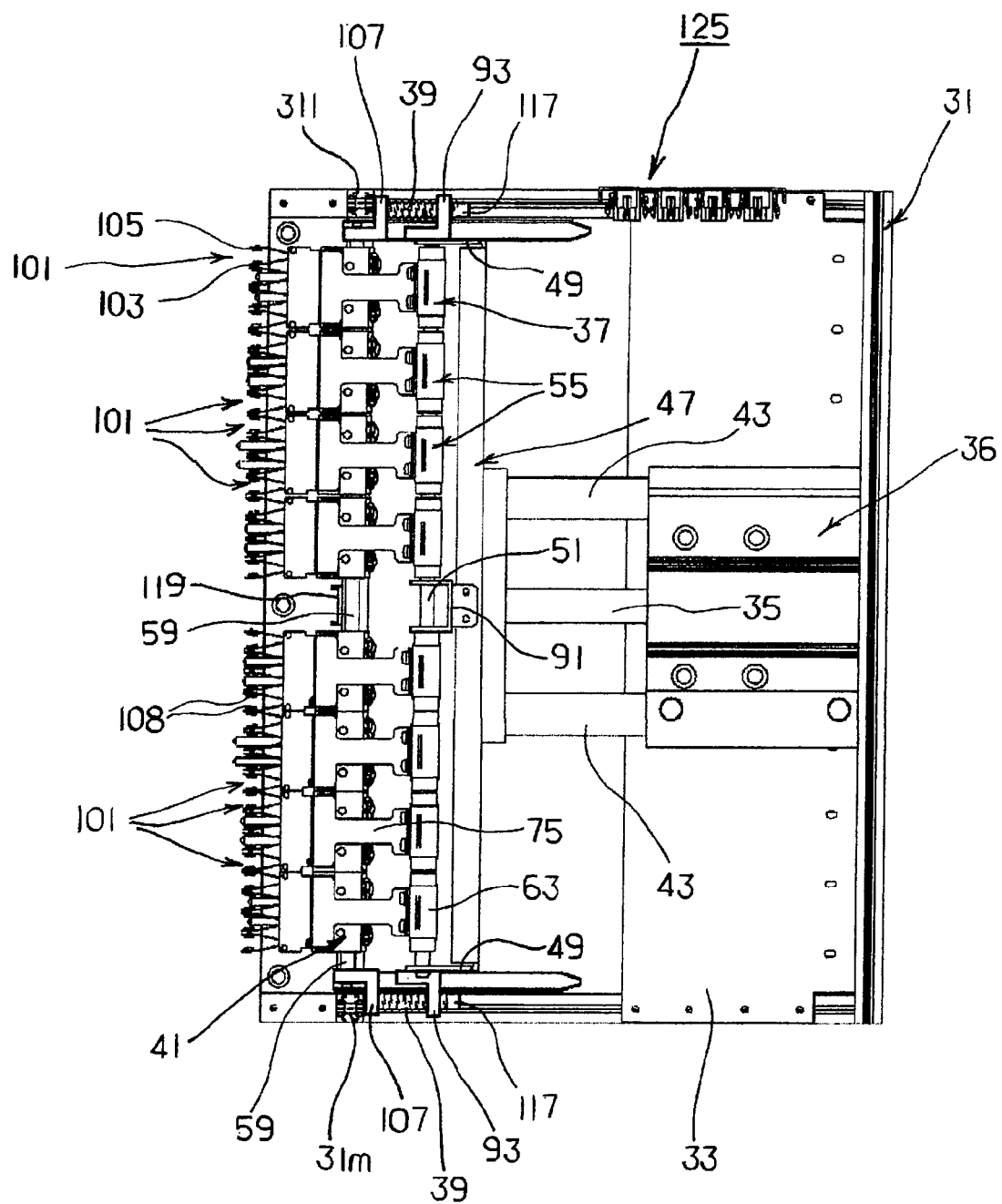
FIG. 8 is a plan view of the chuck mechanism.
Figure 9:
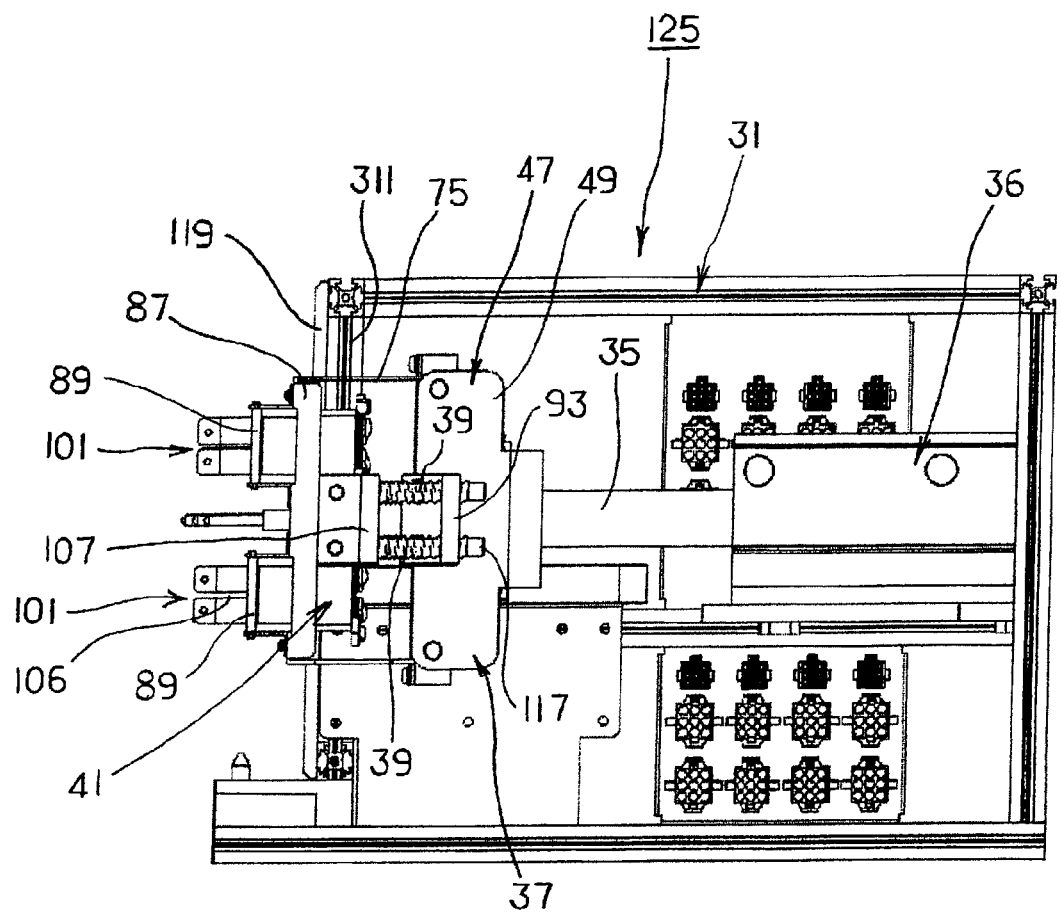
FIG. 9 is a lateral view of the chuck mechanism.
Figure 10:
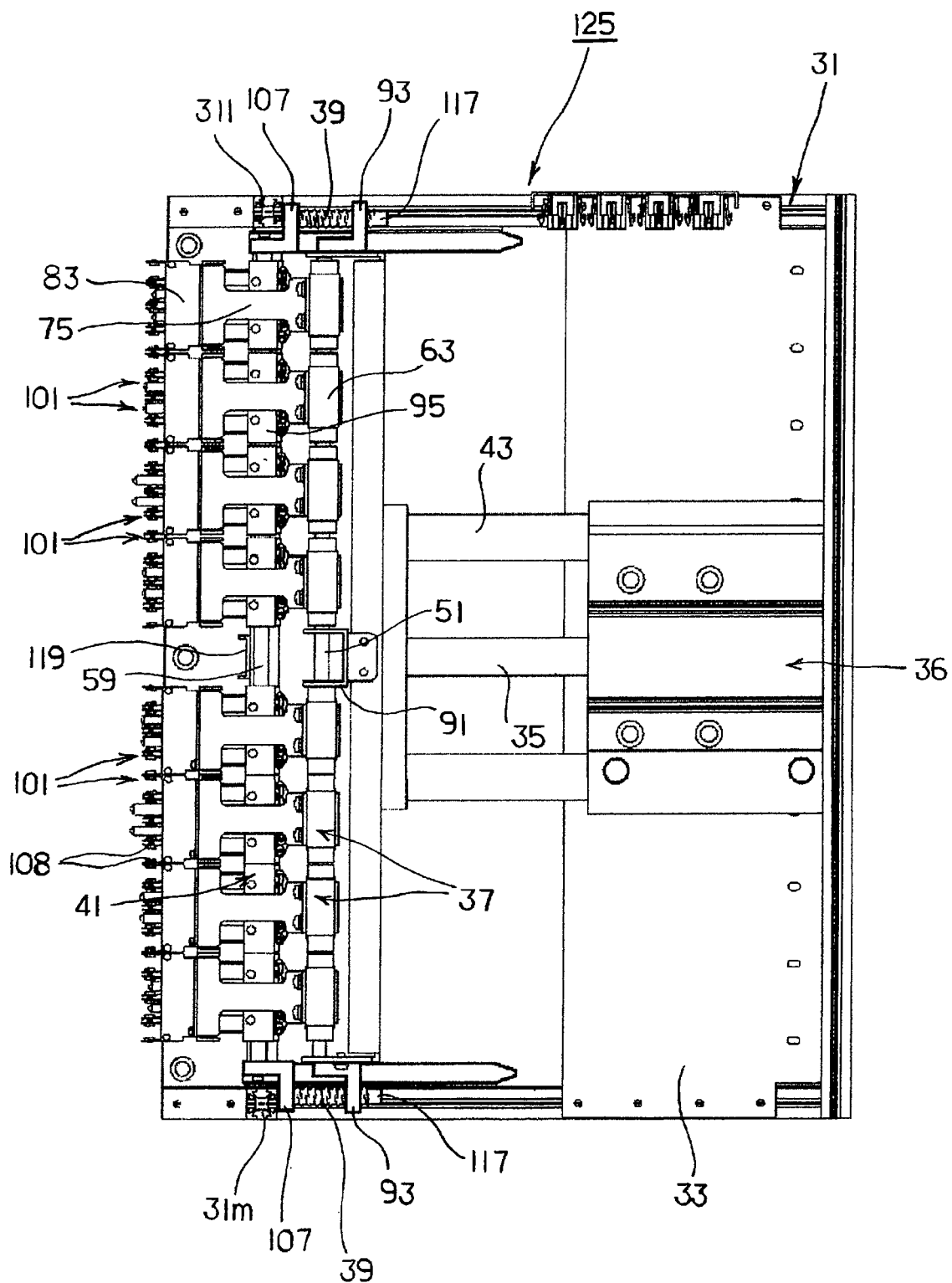
FIG. 10 is a plan view of the chuck mechanism where chuck members are closed by rollers.
Figure 11:
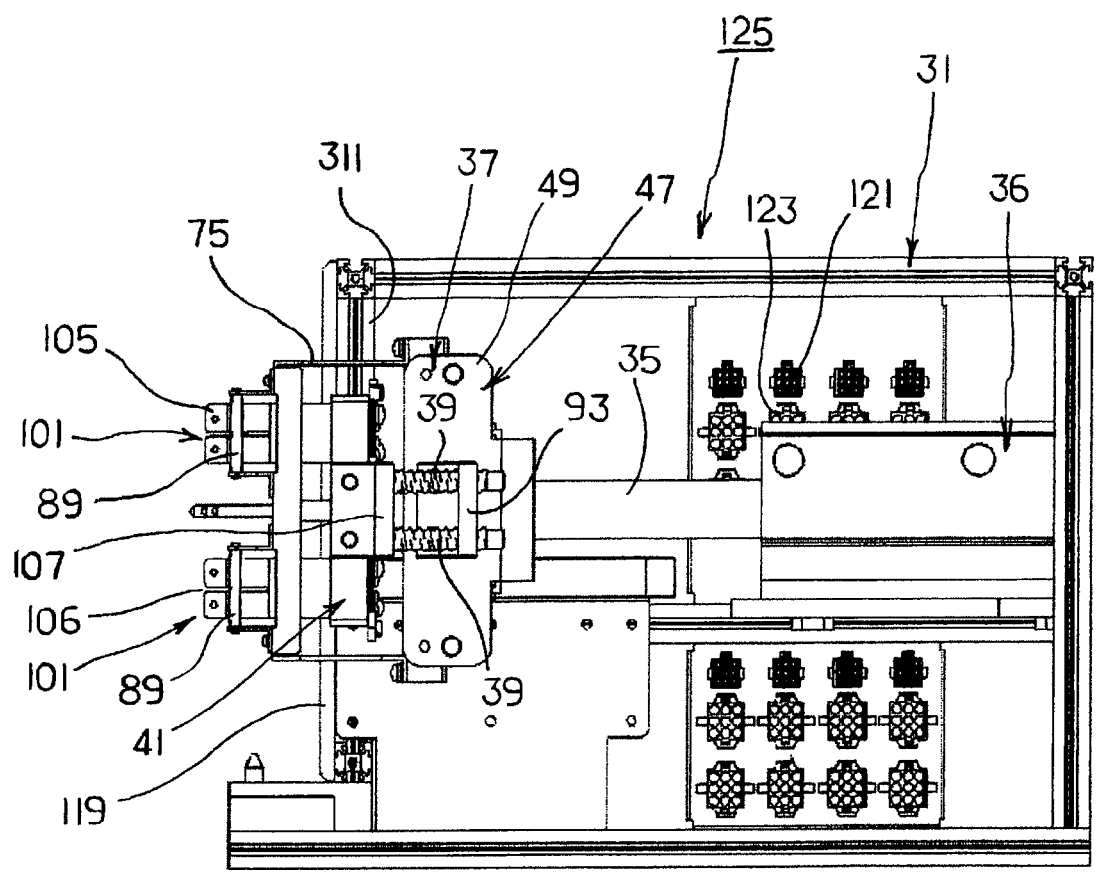
FIG. 11 is a lateral view of the chuck mechanism where the chuck members are closed by the rollers.

When forward movement of the chuck holding member 41 is thus restricted, the chuck members 101 project toward the front of the supporting base 31 as in FIGS. 8 and 9.

Besides, such restriction on the forward movement of the chuck holding member 41 does not hinder driving of the air cylinder 36 at all, and the piston rod 35 extends even further. With this, the roller holding member 37 moves even further forward against the spring force of the left and right coil springs 39 as in FIGS. 10 and 11, causing the pairs of rollers 89 to move forward. Hence, the metal plates 103, 105 of each chuck member 101 being spread open in the substantially V-shape in plan view are closed by the corresponding pair of rollers 89, the pairs of peeling and nipping members 108 attached on the tip ends of the metal plates 103, 105 are pressed against each other, and the piston rod 35 stops its extension at this position.

Incidentally, in the drawings, reference signs 121, 123 denote connectors for connecting wires of a charge-discharge device to the back ends of the metal plates 103, 105 projecting from the back surface of the chuck attachment member 95.

The chuck mechanism 125 of the embodiment is configured in the above-mentioned manner. Accordingly, to carry out a charge-discharge test for the thin secondary battery 1 using the chuck mechanism 125, it suffices that a magazine (resin spacer) 127 in which multiple thin secondary batteries 1 are housed be moved closer to the chuck mechanism 125 as in FIG. 12 by moving means not shown. Note that the piston rod 35 of the air cylinder 36 should be retracted as in FIG. 4 at this time.

Figure 12:
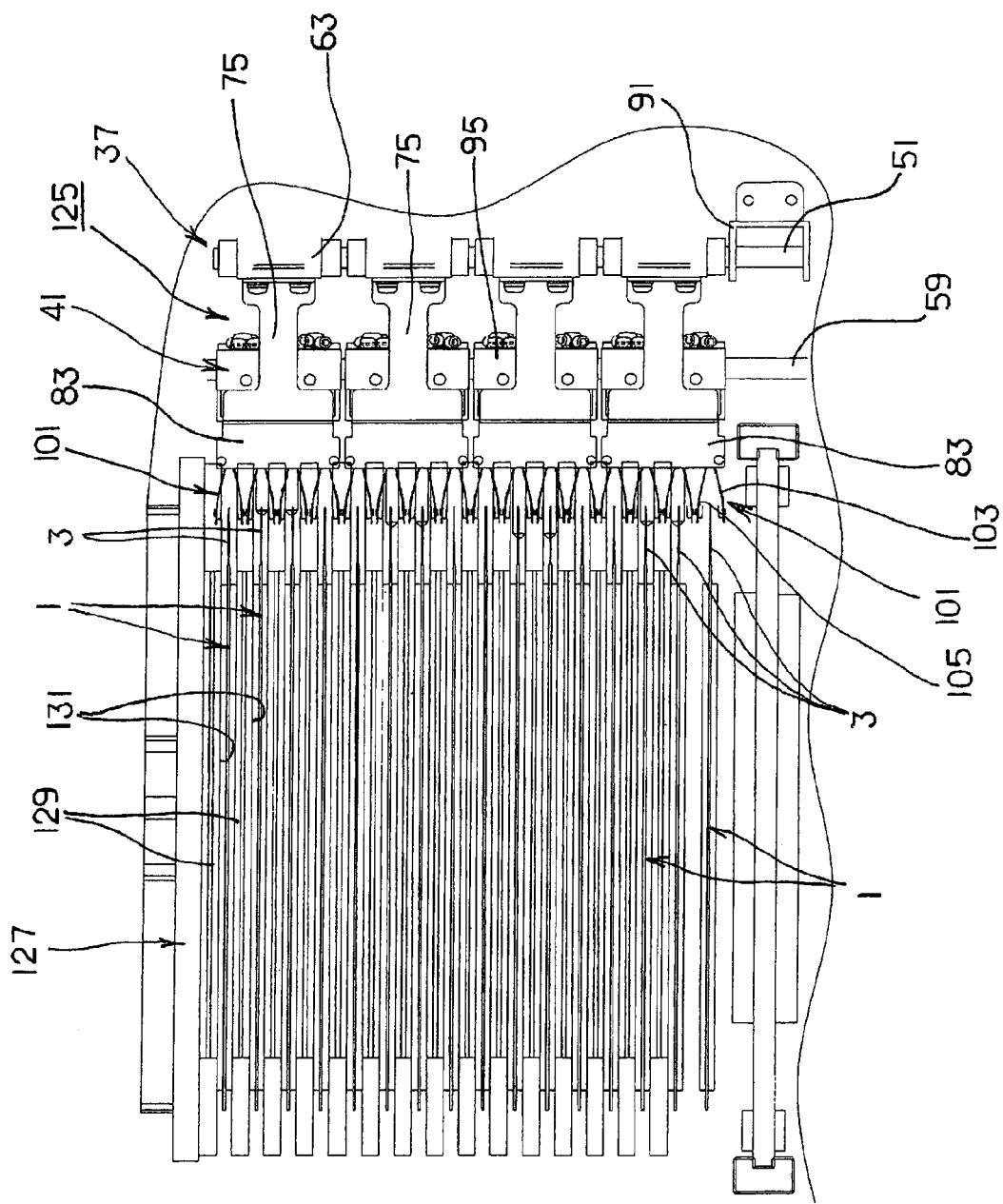
FIG. 12 is a plan view of the chuck mechanism and a magazine.
Figure 13:
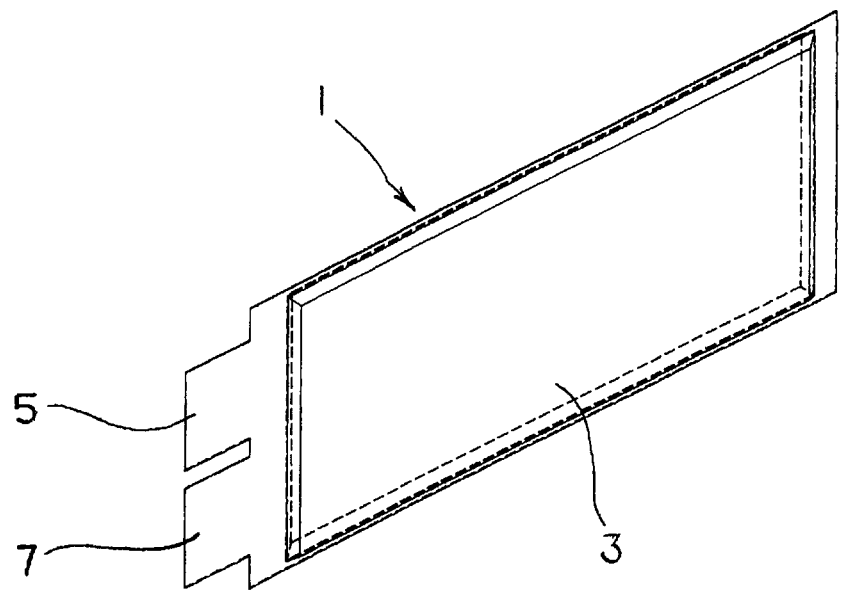
FIG. 13 is a perspective view of a thin secondary battery.
Figure 14:
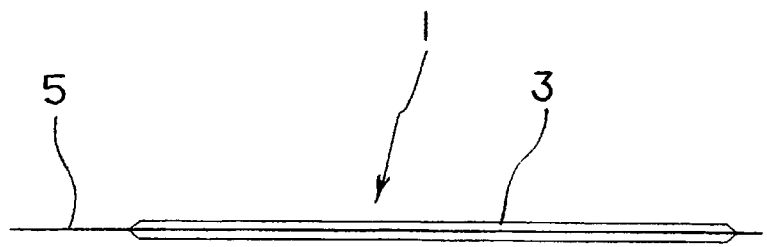
FIG. 14 is a plan view of the thin secondary battery.

As in FIG. 12, in the magazine 127, one each of the multiple thin secondary batteries 1 is housed in each of housing chambers 131 segmented by multiple separation walls 129, in such a manner as to project the pairs of electrode terminals 5, 7 frontward. The magazine 127 is moved closer to the chuck mechanism 125, with the electrode terminals 5, 7 of the thin secondary battery 1 away from the chuck mechanism 125 by a distance equal to a stroke of the piston rod 35, such that the electrode terminals 5, 7 can later be inserted between the pairs of spread-open metal plates 103, 105 of the chuck member 101.

Then, when the air cylinder 36 is driven while the wires of the charge-discharge test device are connected to the back ends of the metal plates 103, 105 projecting from the back surface of the chuck attachment member 95, the piston rod 35 extends forward, and the roller holding member 37 as well as the chuck holding member 41 attached to the roller holding member 37 are moved forward.

Thereafter, when the chuck holding member 41 thus moves, the coupling brackets 107 attached to left and right sides of the chuck holding member 41 come into contact with the left and right columns 31*l*, 31*m* of the supporting base 31, and the shafts 59, 61 come into contact with the column 119 to restrict forward movement of the chuck holding member 41.

At this time, as in FIG. 12, the chuck members 101 have moved to a position where the chuck members 101 can nip the upper and lower electrode terminals 5, 7 of the thin secondary battery 1.

Further, such restriction on the movement of the chuck holding member 41 does not hinder driving of the air cylinder 36 at all, and the piston rod 35 extends even further. Accordingly, the roller holding member 37 moves even further forward against the spring force of the left and right coil springs 39 as in FIGS. 10 and 11, causing the pairs of rollers 89 to move forward. Hence, the metal plates 103, 105 of each chuck member 101 being spread open in the substantially V-shape in plan view are closed by the corresponding pair of rollers 89. Thus, the peeling and nipping members 108 attached on the tip ends of the metal plates 103, 105 nip the upper and lower electrode terminals 5, 7 of the thin secondary battery 1 from left and right sides.

In the embodiment, the tip end sides of the metal plates 103, 105 are segmented by providing the slit 106 in each of the tip ends of the metal plates 103, 105 in the front-rear direction. For this reason, even if there is an assembly error or the like in the metal plates 103, 105, the peeling and nipping members 108 are surely pressed against the surfaces of the electrode terminals 5, 7 so that the irregularities 108*c* of the nipping surfaces may peel off the oxide film formed on the surfaces of the electrode terminals 5, 7.

Thereafter, electricity is supplied through the wires of the charge-discharge test connected to the back end side of the chuck member 101 (the metal plates 103, 105), and the charge-discharge test for the thin secondary batteries 1 nipped by the chuck members 101 is started.

Then, after completion of the test, the piston rod 35 of the air cylinder 36 is retracted to move the roller holding member 37 and the chuck holding member 41 backward. With this, the metal plates 103, 105 of the chuck member 101 which were closed by the roller 89 are spread open again, and are separated from the electrode terminals 5, 7.

Thus, use of the chuck mechanism 125 of the embodiment when carrying out a charge-discharge test for the thin secondary battery 1 not only makes it possible to carry out the charge-discharge test for a large number of thin secondary batteries 1 at once, but also has the following advantage. Specifically, the chuck mechanism 125 is configured such that only a simple mechanism of driving the air cylinder 36 to extend the piston rod 35 is required for the multiple pairs of rollers 89 of the roller holding member 37 to make the chuck members 101 (the multiple pairs of metal plates 103, 105) of the chuck holding member 41 perform the chucking action. Thus, action controllability is improved significantly as compared to the conventional example disclosed in Patent Document 1.

The use of the chuck mechanism 125 also has the following advantages. Specifically, since the mechanism is configured such that the pair of rollers 89 are used to close the metal plates 103, 105 of the chuck member 101 being spread open, opening and closing actions of the metal plates 103, 105 can be performed smoothly. Moreover, since the tip end sides of the metal plates 103, 105 are segmented by providing the slit 106 in each of the tip ends of the metal plates 103, 105 in the front-rear direction, the metal plates 103, 105 (the peeling and nipping members 108) can surely nip the electrode terminals 5, 7 as well as can favorably peel off the oxide film on the surfaces of the electrode terminals 5, 7 by using the irregularities 108*c*, even if there is an assembly error or the like in the metal plates 103, 105.

Furthermore, the roller holding member 37 is formed by disposing the multiple divided roller holding members 55 laterally in parallel, and the chuck holding member 41 is formed by disposing the multiple divided chuck holding members 57 laterally in parallel. Hence, the chuck mechanism 125 has an advantage that its maintenance is easy since the individual parts can be changed easily.

Note that although the embodiment uses the air cylinder 36 as the drive means for moving the roller holding member 37 and other components forward and backward, the drive means is not limited to the air cylinder, but may be a motor or another actuator.

REFERENCE SIGNS LIST 1 thin secondary battery
5, 7 electrode terminal
31 supporting base
31*a* to 31*o*, 119 column
33 supporting plate
35 piston rod
36 air cylinder
37 roller holding member
39 coil spring
41 chuck holding member
43, 109 guide member
45 coupling member
47 supporting bracket
51, 53, 59, 61 shaft
55 divided roller holding member
57 divided chuck holding member 63, 65 block member
67 coupling plate
69, 71, 97, 99, 115 shaft insertion hole
75 arm member
81 roller attachment plate
83, 85 roller attachment bracket
87 roller attachment hole
89 roller
91 holding member
93, 107 coupling bracket
95 chuck attachment member
101 chuck member
103, 105 metal plate
106 slit
108 peeling and nipping member
111, 113 plate
117 shaft
125 chuck mechanism
127 magazine

The invention claimed is:

1. A chuck mechanism of a charge-discharge test device for a thin secondary battery, comprising a supporting base including:
a chuck unit comprising:
a roller holding member formed to be movable in a direction toward a battery container body housing a thin secondary battery in front of the supporting base, and including on a front surface thereof a plurality of pairs of rollers rotatably disposed in parallel in a left-right direction; and
a chuck holding member attached in front of the roller holding member, and including a plurality of chuck members each formed of a pair of strip-shaped metal plates which are inserted between the corresponding pair of rollers and whose tip end sides are spread open toward the front in a substantially V-shape in plan view;
a drive part for moving the chuck unit; and
a restriction part for restricting a forward movement of the chuck holding member,
wherein the movement of the chuck holding member moved forward together with the roller holding member by the driving of the drive part is restricted by the restriction part, and
the tip end sides of each of the chuck members of the chuck holding member inserted between the corresponding pair of rollers of the roller holding member are closed by the corresponding pair of rollers when the roller holding member moves forward even further,
so that each of the chuck members chucks an electrode terminal of each of thin secondary batteries housed in the battery container body in correspondence with the chuck members.

2. The chuck mechanism of a charge-discharge test device for a thin secondary battery according to claim 1, wherein:
the roller holding member is formed by disposing a plurality of divided roller holding members in parallel on two upper and lower shafts arranged in the left-right direction of the supporting base;
the chuck holding member is formed by disposing a plurality of divided chuck holding members in parallel on two upper and lower shafts arranged in the left-right direction of the supporting base; and
a spring member extends between each of coupling brackets attached to left and right outer peripheries of the roller holding member and a corresponding one of coupling brackets attached to left and right outer peripheries of the chuck holding member.

3. The chuck mechanism of a charge-discharge test device for a thin secondary battery according to claim 1, wherein an oxide film peeling and nipping member is attached to tip ends of the pair of metal plates.

4. The chuck mechanism of a charge-discharge test device for a thin secondary battery according to claim 3, wherein a slit is formed in the tip ends of the pair of metal plates in a front-rear direction, and the oxide film peeling and nipping member is attached to each of tip ends of each metal plate partitioned by the slit.

5. A chuck mechanism of a charge-discharge test device for a thin secondary battery, comprising a supporting base including:
a chuck unit comprising:
a roller holding member formed to be movable in a direction toward a battery container body housing a thin secondary battery in front of the supporting base, and including on a front surface thereof a plurality of pairs of rollers rotatably disposed in parallel in a left-right direction; and
a chuck holding member attached in front of the roller holding member, and including a plurality of chuck members each formed of a pair of strip-shaped metal plates which are inserted between the corresponding pair of rollers and whose tip end sides are spread open toward the front in a substantially V-shape in plan view;
drive means for moving the chuck unit; and
a restriction part for restricting a forward movement of the chuck holding member,
wherein the movement of the chuck holding member moved forward together with the roller holding member by the driving of the drive means is restricted by the restriction part, and
the tip end sides of each of the chuck members of the chuck holding member inserted between the corresponding pair of rollers of the roller holding member are closed by the corresponding pair of rollers when the roller holding member moves forward even further,
so that each of the chuck members chucks an electrode terminal of each of thin secondary batteries housed in the battery container body in correspondence with the chuck members.

* * * * *